April 7, 1970     J. C. POLAK     3,504,563

EXTERNAL FINAL DRIVE DISCONNECT

Filed Sept. 18, 1968

INVENTOR.
James C. Polak
BY
a.M. Heiter
ATTORNEY

United States Patent Office 3,504,563
Patented Apr. 7, 1970

3,504,563
EXTERNAL FINAL DRIVE DISCONNECT
James C. Polak, Indianapolis, Ind., assignor to General Motors Corporation, Detroit, Mich., a corporation of Delaware
Filed Sept. 18, 1968, Ser. No. 760,537
Int. Cl. F16h 57/00; F16d 11/10
U.S. Cl. 74—405                                     16 Claims

ABSTRACT OF THE DISCLOSURE

A final transmission drive assembly embodying an externally accessible disconnect device used on a vehicle to disconnect the drives between the transmission output and the final drive input, permitting field preparation of the vehicle for towing, said final drive assembly including means accessible at the hub of the usual drive wheel for axially sliding the central bolt or quill shaft, the sun gear, and the internally splined final drive input shaft to a new position such that the latter shaft is completely disconnected from an externally splined coupling member which is rotated by the axle or cross-drive transmission output shaft, while the sun gear remains in mesh with the planet pinions.

---

This invention relates generally to vehicular final drive assemblies and more particularly to an improved assembly including features which provide ready external access thereto.

It is desirable in most vehicular power trains to provide means for attaining access to the final drive assembly, in the event of a failure of the power package, in order to quickly and easily prepare the vehicle for towing (1) without motoring the transmission, and (2) without having to remove heavy access plates and performing very tedious and laborious work in a cramped power package compartment to disengage the drive line.

Accordingly, a primary object of the invention is to provide a new and improved final drive assembly embodying the above desirable disconnect features.

Another object of the invention is to provide such a final drive assembly which includes means accessible at the hub of the usual drive wheel for axially sliding the central bolt or quill shaft, the sun gear, and the internally splined final drive input shaft to a new position such that the latter shaft is completely disconnected from an externally splined coupling member which is rotated by the axle or cross-drive transmission output shaft, while the sun gear remains in mesh with the planet pinions.

Figure 1:
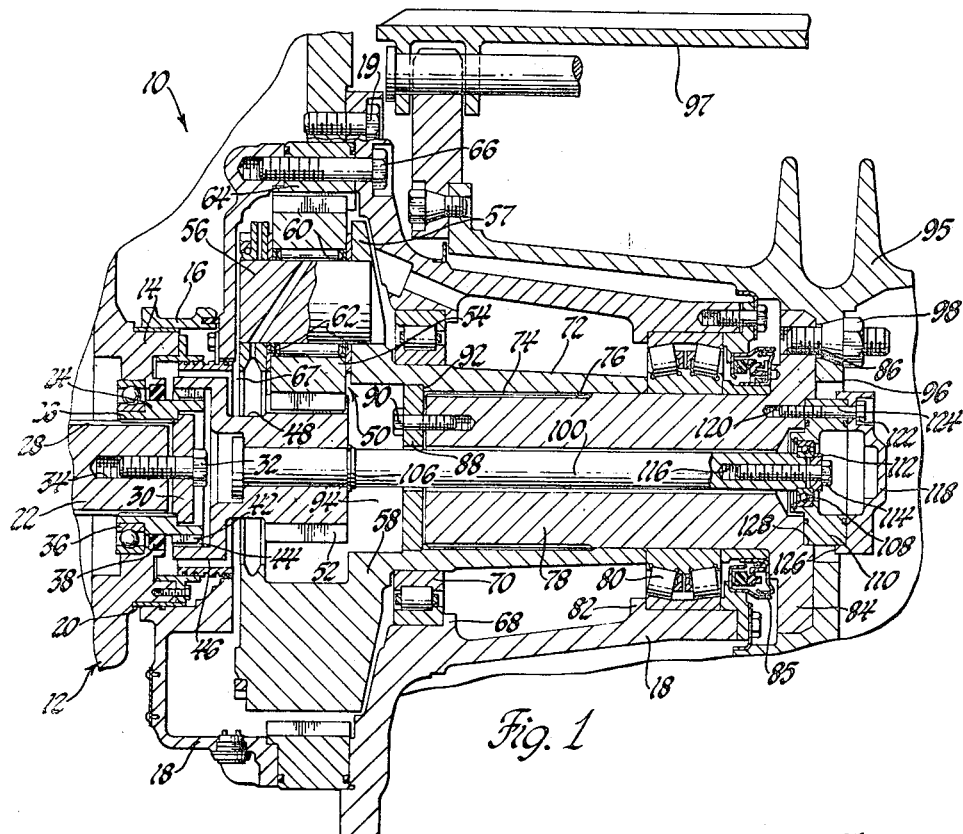
Figure 2:
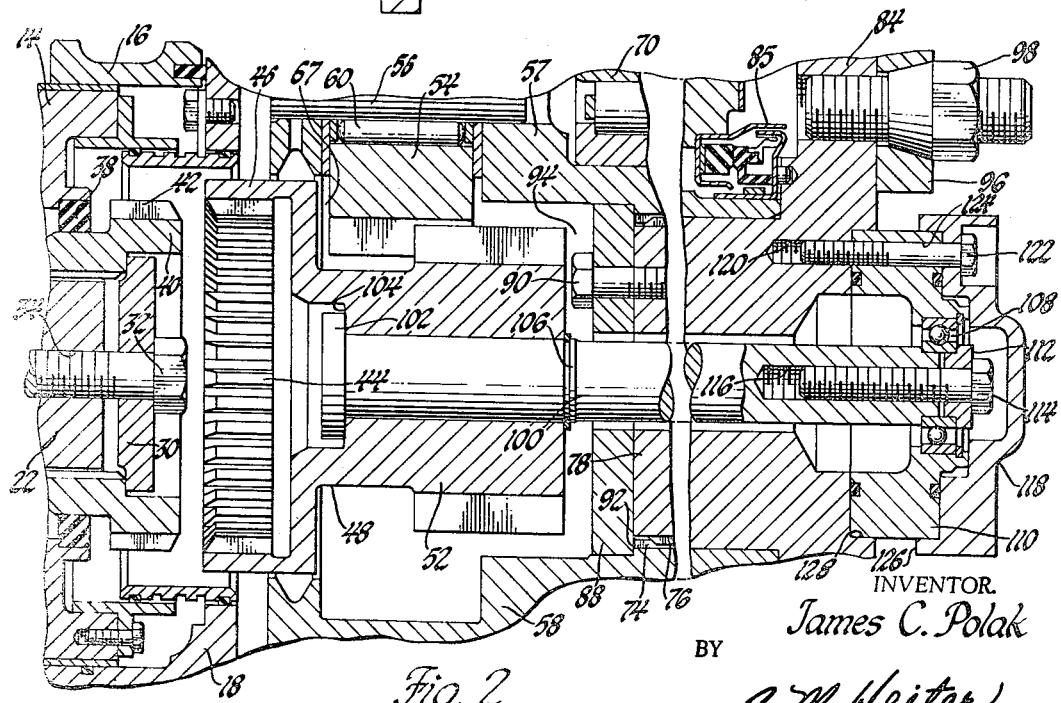

Other objects and advantages of the invention will become more apparent when reference is made to the following specification and accompanying drawings wherein:

FIGURE 1 is a fragmentary cross-sectional view of a final drive assembly embodying the invention; and FIGURE 2 is an enlarged fragmentary cross-sectional view of the final drive assembly illustrated in FIGURE 1 showing portions thereof in a disconnected position in accordance with the invention.

Referring now to the drawings in greater detail, FIGURE 1 illustrates a final transmission drive assembly 10 wherein there is partially shown at 12 one output side of a cross-drive transission including an end portion 14 of the transmission case. The end portion 14 extends into a semicylindrical transmission support saddle 16 of the final drive assembly 10 which is, in turn, supported through its housing 18 in a vehicle by any suitable fastening means, such as a bolt 19. A sleeve 20 is provided within the support saddle 16 around the end portion 14, serving as a wear-resistant mounting surface for the transmission. The end portion 14 of the transmission case is hollow and houses a driving member or cross-drive transmission output shaft 22, provided with a coupling member 24. The member 24 is secured to the output shaft 22 by internal splines 26, which mesh with external splines 28 formed adjacent the end of the output shaft 22 to prevent relative rotational movement therebetween, and is retained from longitudinal movement thereon by a retainer or plate 30 and a bolt 32. The bolt 32 extends through the plate 30 and threads into a threaded opening 34 formed in the end of the output shaft 22.

A suitable annular antifriction bearing 36 rotatably supports the coupling member 24 and the end of the output shaft 22 in the end portion 14 of the transmission case. Also, an annular fluid seal 38, located between the outer periphery of the coupling member 24 and the interior of the end portion 14 of the transmission case, is provided to seal the transmission from the final drive assembly 10. The coupling member 24 is formed with a head portion 40 having external splines 42 formed thereon which are adapted to mesh with internal splines 44 formed in a hollow end portion 46 of a final drive input shaft 48. The other end of the input shaft 48 extends into the final drive planetary gear system 50 which will now be described.

An integral sun gear 52 is formed on the end of the input shaft 48 opposite the splined end portion 46. The sun gear 52 meshes with a plurality of gears or planet pinions 54, only one of which is shown, whose spindles 56 are confined within the front portion 57 of a support structure 58 of the final drive assembly 10 which provides a rotatable carrier for the planet pinions 54. Roller bearings 60 rotatably support the planet pinions 54 on their spindles 56 and are retained in operating position by annular spacers 62. The planet pinions 54 mesh with an output ring gear 64 which may be secured between front and rear portions of the final drive assembly housing 18 by bolts 66. A cavity 67 remains between the end portion 46 of the input shaft 48 and the planet pinions 54 for a purpose to be described.

As shown, the housing 18 includes a seat 68 for a bearing 70. The bearing 70 rotatably supports the structure 58, the rear portion of which forms an output sleeve shaft 72. The sleeve shaft 72 includes internal splines 74 which mesh with external splines 76 formed on a driven member or final drive assembly output shaft 78, the final drive input shaft 48, the sun gear 52, the planet pinions 54 and the output sleeve shaft 72 serving as a connecting means between the driving member 22 and the driven member 78. The output shaft 78 extends through the sleeve shaft 72 and is supported beyond the end of the sleeve shaft 72 by a bearing 80 which is mounted on a seat 82 formed in the housing 18. The shaft 78 terminates in an external cylindrical output flange 84. A suitable seal 85 is confined between the bearing 80 and the back face of the flange 84. A plurality of threaded openings 86 are formed adjacent the outer periphery of the output flange 84. The shaft 78 is held in axial alignment by means of an end plate 88 which is secured to the inboard end thereof by bolts 90. The plate 88 abuts against a step 92 formed within the sleeve shaft 72. A cavity 94 remains between the plate 88 and the sun gear 52 for a purpose to be described.

A sprocket assembly 95 driving a track 97, or other suitable ground propulsion means, includes an internal flange 96 which is mounted against the output flange 84 and secured thereto by means of studs and nuts, or bolts 98, threaded into the openings 86.

A central bolt or quill shaft 100 extends through the output shaft 78 and the sun gear 52. A flange 102 is formed on the inboard end of the shaft 100 and abuts against a step 104 formed within the input shaft 48 on one side of the sun gear 52. A collar 106 is formed adjacent the other face of the sun gear 52, such as by means of a snap ring mounted in a groove formed on the shaft 100.

At the outboard end, the quill shaft 100 is supported by a bearing 108 mounted in a support member or cage assembly 110, the bearing and a suitable end retainer 112 being secured to the end of the shaft 100 by means of a centrally located bolt 114 fastened to a threaded axial passage 116 formed in the end of the shaft 100. The bearing and cage assembly are covered by an end cap 118 which is secured to threaded openings 120 formed on the outer face of the output shaft 78 by means of bolts 122 mounted through openings 124 formed through the cage assembly 110. A pilot shoulder 126 is formed on the cover 118 to protect either end portion of the cage assembly 110 for insertion in the pilot bore 128 during the connecting or disconnecting operations.

When it becomes necessary to prepare the vehicle for towing, the following relatively simple operations are performed.

First, the bolts 122 and the cap or cover 118 are removed; next, the central bolt 114 and the end retainer 112 are removed, followed by removal of the bearing 108 and cage assembly 110.

The bearing 108 and cage assembly 110 are next turned around and replaced facing in the opposite direction, as illustrated in FIGURE 2. The bolt 114 and end retainer 112 are then replaced, the bolt 114 extending into the threaded central opening 116 on the end of the quill shaft 100.

It may be noted that the tightening operation of the bolt 114 will cause the quill shaft 100 and the sun gear 52 to move to the right. By virtue of the flange 102 pulling against the left side of the sun gear 52, thereby disengaging the internal splines 44 from the external splines 42 formed on the coupling member 24. The new final positions of the final drive input shaft 48, and the sun gear 52 are in the cavities 67 and 94, respectively, as illustrated in FIGURE 2. It may be further noted that the sun gear 52 and the planet pinions 54 remain in mesh and the quill shaft remains supported by the bearing 108 in both positions. Should any residual torque load tend to prevent the sliding of the splines 44 out of mesh with the splines 42, the vehicle may be nudged one way or the other until the coupling is free of load.

Lastly, the end cover 118 is replaced, and it and the cage are secured by the bolts 122, and the vehicle is ready for towing without having to motor the transmission, as a result of the positive disconnect arrangement just described.

When it is desired to once again connect the drive, the bolts 122 and cover 118 are removed, the bearing 108 and cage assembly 110 are reversed on the extended shaft 100, the cover 118 is replaced and the bolts 122 are inserted and tightened to push the shaft 100 and the attached sun gear 52 to the engaged position as described for FIGURE 1.

It should be apparent that the invention provides a quick and easy access to the final drive assembly in order to prepare the vehicle for towing without motoring the transmission or having to remove heavy access plates and performing very tedious and laborious work in a cramped power package compartment to disengage the cross-drive transmission output from the final drive input.

While but one embodiment of the invention has been disclosed and described, it is apparent that other modifications of the invention are possible.

I claim:

1. A final drive assembly for a vehicle, said assembly comprising a driving member driven by a transmission, a final drive input shaft, spline means for interconnecting said driving member and said input shaft in a connecting position and disconnecting said driving member and said input shaft in a disconnecting position, a sun gear rotatable by and fixed for movement with said input shaft, planet gears meshing with said sun gear, a ring gear element meshing with said planet gears, said planet gears being rotatably mounted on a carrier element, an output shaft connected to one of said elements, means operatively connected to hold the other of said elements for driving said one element, ground propulsion means operatively connected to said output shaft and driven thereby, a quill shaft mounted through said output shaft and said sun gear, and means operatively connected to said output shaft and said quill shaft for slidably axially moving said quill shaft and said input shaft from said connecting position to said disconnecting position, thereby disconnecting said spline means interconnecting said driving member and said input shaft and said sun gear sliding axially relative to sai dplanet gears and remaining partially in mesh therewith.

2. The assembly described in claim 1, wherein said last-mentioned means includes confining means associated with said quill shaft on both sides of said sun gear.

3. The assembly described in claim 2, wherein said confining means consists of flanges formed on said quill shaft.

4. The assembly described in claim 1, wherein said last-mentioned means includes a cage assembly secured to the end of said output shaft, a bearing rotatably mounted in said cage assembly and around said quill shaft, a retainer mounted against the ends of said bearing and said quill shaft, and a bolt secured to said quill shaft through said retainer.

5. The assembly described in claim 4, including, additionally, an end cover secured to said cage assembly.

6. The assembly described in claim 5, wherein said cage assembly may be reversed, causing said bolt and said retainer to be positioned closer to said end cover.

7. The assembly described in claim 6, wherein tightening of said bolt into said quill shaft will cause said quill shaft, said sun gear and said final drive input shaft to move toward said end cover and thereby disengage said spline means interconnecting said driving member and said final drive input shaft.

8. The assembly described in claim 1, including, additionally, a sprocket assembly fixedly secured to said output shaft and having said ground propulsion means mounted for rotation thereon.

9. The assembly described in claim 1, wherein said output shaft includes an output sleeve shaft secured to said rotatable carrier, an inner shaft mounted in said sleeve shaft, and spline means interconnecting said sleeve shaft and said inner shaft, said quill shaft being slidably mounted in said inner shaft.

10. A final drive assembly for a vehicle, said assembly comprising a driving member driven by a transmission, a hollow final drive input shaft, spline means for interconnecting said driving member and said input shaft, a sun gear formed on said input shaft, planet pinions surrounding and in mesh with said sun gear, a rotatable carrier for said planet pinions, an output sleeve shaft operatively connected to said carrier, a ring gear surrounding and in mesh with said planet pinions, a final drive assembly output shaft mounted within said output sleeve shaft, spline means for interconnecting said sleeve shaft and said final drive output shaft, a sprocket assembly fixedly secured to said output shaft, ground propulsion means operatively connected to said sprocket assembly and driven thereby, a quill shaft mounted through said final drive output shaft and said sun gear, a flange formed on said quill shaft on each side of said sun gear, and means mounted on the end of said final drive output shaft for rotatably supporting said quill shaft and for slidably moving said quill shaft, said sun gear and said final drive input shaft to disconnect said first-mentioned spline means.

11. The assembly described in claim 10, wherein said last-mentioned means includes a cage assembly secured to the end of said final drive output shaft, a bearing rotatably mounted in said cage assembly and around said quill shaft, a retainer mounted against the ends of said bearing and said quill shaft, and a bolt secured to said quill shaft through said retainer.

12. The assembly described in claim 11, including, additionally, an end cover secured to said cage assembly.

13. The assembly described in claim 12, wherein said cage assembly may be reversed, causing said bolt and said retainer to be positioned closer to said end cover.

14. The assembly described in claim 13, wherein tightening of said bolt into said quill shaft will cause said quill shaft, said sun gear and said final drive input shaft to move toward said end cover and thereby disengage said spline means interconnecting said driving member and said final drive input shaft.

15. A final drive assembly for a vehicle, said assembly comprising a driving member driven by a transmission, a hollow final drive input shaft, spline means having a first position for interconnecting said driving member and said input shaft and a second axially displaced position for disconnecting said driving member and said input shaft, a sun gear formed on said input shaft, planet pinions surrounding and in mesh with said sun gear, a rotatable carrier for said planet pinions, an output sleeve shaft operatively connected to said carrier, a ring gear surrounding and in mesh with said planet pinions, a final drive assembly output shaft mounted within said output sleeve shaft, spline means for interconnecting said sleeve shaft and said final drive output shaft, a sprocket assembly fixedly secured to said output shaft, ground propulsion means operatively connected to said sprocket assembly and driven thereby, a quill shaft mounted through said final drive output shaft and said sun gear, a flange formed on said quill shaft on each side of said sun gear, and cage means including bearing means between said cage means and said quill shaft and first seating means to axially position said quill shaft, said sun gear and said input shaft in said first position, said cage means also including second seating means operative with said bearing means when said cage means is repositioned by being turned around to face in the opposite axial direction for repositioning the bearing means to hold said quill shaft, said sun gear and said input shaft in said second position disconnecting said first-mentioned spline means.

16. A final drive assembly for a vehicle, said assembly comprising a driving member driven by a transmission, a final drive input shaft, spline means for interconnecting said driving member and said input shaft in a connecting position and disconnecting said driving member and said input shaft in a disconnecting position, an output shaft, means for drivably connecting said input shaft and said output shaft and for permitting slidable axial movement of said input shaft relative to said output shaft, ground propulsion means operatively connected to said output shaft and driven thereby, a quill shaft mounted through said output shaft and means operatively connected to said output shaft and said quill shaft for slidably axially moving said quill shaft and said input shaft from said connecting position to said disconnecting position, thereby disconnecting said spline means interconnecting said driving member and said input shaft.

References Cited

UNITED STATES PATENTS

| 2,634,710 | 4/1953 | Giacosa | 74—405 X |
| 3,434,364 | 3/1969 | Keese | 74—391 |

LEONARD H. GERIN, Primary Examiner

U.S. Cl. X.R.

74—391; 192—67